United States Patent
Weiss et al.

(10) Patent No.: US 8,816,832 B2
(45) Date of Patent: Aug. 26, 2014

(54) SYSTEM FOR COUPLING A POWER LINE COMMUNICATION DEVICE TO A POWER LINE NETWORK

(75) Inventors: Uri Weiss, Herzliya (IL); Dror Ben-Yehuda, Kiryat Ono (IL); Naftali Chayat, Kfar Saba (IL)

(73) Assignees: Sigma Designs Israel S.D.I Ltd., Tel-Aviv (IL); Alvarion Technologies Ltd, Tel-Aviv (IL)

(*) Notice: Subject to any disclaimer, the term of this patent is extended or adjusted under 35 U.S.C. 154(b) by 0 days.

(21) Appl. No.: 13/985,535

(22) PCT Filed: Feb. 15, 2012

(86) PCT No.: PCT/IL2012/000078
§ 371 (c)(1),
(2), (4) Date: Aug. 14, 2013

(87) PCT Pub. No.: WO2012/111003
PCT Pub. Date: Aug. 23, 2012

(65) Prior Publication Data
US 2013/0320775 A1  Dec. 5, 2013

Related U.S. Application Data

(60) Provisional application No. 61/443,078, filed on Feb. 15, 2011.

(51) Int. Cl.
G05B 11/01 (2006.01)
G08C 19/16 (2006.01)

(52) U.S. Cl.
USPC ............... 340/12.38; 340/12.32; 340/538.16; 307/104; 307/23; 307/3; 333/124; 375/258

(58) Field of Classification Search
CPC .... H04B 3/54; H04B 3/56; H04B 2203/5483; H04B 3/542; H04B 2203/5416; H04B 2203/5441; H04B 2203/547; H04B 2203/5445; H04L 27/00; H04L 27/2602

USPC ......... 340/12.32, 12.38, 538.16; 307/104, 23, 307/3; 333/124; 375/258
See application file for complete search history.

(56) References Cited

U.S. PATENT DOCUMENTS

2002/0021209 A1   2/2002  Fisher et al.
2002/0027496 A1*  3/2002  Cern et al. ............... 340/310.01
(Continued)

FOREIGN PATENT DOCUMENTS

EP   1858174 B1   12/2010
EP   2157704 B1    1/2012
(Continued)

OTHER PUBLICATIONS

International Search Report for PCT/IL2012/000078, dated Jun. 25, 2012.

(Continued)

Primary Examiner — Omer S Khan
(74) Attorney, Agent, or Firm — Marshall, Gerstein & Borun LLP

(57) ABSTRACT

Coupling circuit for coupling a power line communication device to a power line network, including a first network port coupled between a network phase line and a first network line, a second network port coupled between a network neutral line and a second network line, a third network port coupled between a network ground line and a third network line, a first differential modem port including a first terminal and a second terminal, a second differential modem port including a third terminal and a fourth terminal, a first transformer including a first network side winding and a first modem side winding, a second transformer including a second network side winding and a second modem side winding, the transformers including respective terminals, a center tap extending from the midpoint of the first network side winding to a terminal of the second network side winding and a plurality of capacitors.

7 Claims, 4 Drawing Sheets

(56) References Cited

U.S. PATENT DOCUMENTS

| | | | |
|---|---|---|---|
| 2002/0105413 A1* | 8/2002 | Cern et al. | 340/310.01 |
| 2003/0160684 A1* | 8/2003 | Cern | 340/310.01 |
| 2004/0142599 A1* | 7/2004 | Cope et al. | 439/620 |
| 2006/0044076 A1* | 3/2006 | Law | 333/124 |
| 2007/0036171 A1 | 2/2007 | Magin | |
| 2008/0258556 A1* | 10/2008 | Ewing et al. | 307/23 |
| 2008/0316004 A1* | 12/2008 | Kiko | 340/310.13 |

FOREIGN PATENT DOCUMENTS

| | | |
|---|---|---|
| WO | WO-2005067164 A1 | 7/2005 |
| WO | WO-2010101661 A1 | 9/2010 |

OTHER PUBLICATIONS

Written Opinion of the International Searching Authority for PCT/IL20012/000078, dated Jun. 25, 2013.

* cited by examiner

SYSTEM FOR COUPLING A POWER LINE COMMUNICATION DEVICE TO A POWER LINE NETWORK

CROSS-REFERENCE TO RELATED APPLICATIONS

The is a US national phase under 35 USC 371 of International Patent Application No. PCT/IL2012/000078 filed Feb. 12, 2012, which claims the priority benefit of U.S. Provisional Application No. 61/443,078 filed Feb. 15, 2011, the entire respective disclosures of which are incorporated herein by reference.

FIELD OF THE DISCLOSED TECHNIQUE

The disclosed technique relates to power line communication, in general, and to methods and systems for inductively coupling a power line communication modem to a power line network so that the phase-neutral interface of the power line network is balanced, in particular.

BACKGROUND OF THE DISCLOSED TECHNIQUE

Power line communication (herein abbreviated PLC) refers to systems for enabling data to be transferred over electrical cables. PLC is also referred to in the art as a power line digital subscriber line, a power line carrier, mains communication, power line telecom and power line networking. Electrical cables can also be referred to as power cables, power lines, electrical power lines, electrical wiring, electrical cabling and the like. These terms are used interchangeably herein and represent the cabling used to transfer electricity from an electricity provider, such as an electric company (e.g. Pacific Gas & Electric, Florida Power & Light, etc. . . . ) or an electricity generator (e.g., a wind energy converter), to a residence, as well as the wires used in a residence to transfer electricity to various wall sockets, electrical outlets, wall plugs and power points in the residence.

PLC enables various electrical devices, such as computers, printers, televisions and other electrical devices in a residence, to be coupled with one another as a network without the need for new wires to be added to the residence. A residence can refer to a private home, an apartment building, an office building or other structures where people live that receive electricity. In effect, the electric cabling forms the backbone of a power line network or a PLC network. Each electrical device to be coupled in the network requires a separate communication device for enabling it to transfer data over the electrical wiring. Such a communication device is usually referred to as a modem, and commonly referred to in the art as a power line modem. Such modems usually transfer data in a high frequency range, such as on the order of megahertz or higher. PLC systems and methods are known in the art.

Traditionally, power lines and their associated networks were designed for providing electricity and not for the purposes of communication and were thus not designed to provide an optimal medium for transferring data. Power line networks suffer from high levels of noise, which distorts and interferes with communication signals. Noise in PLC networks can be defined as any undesirable voltage signal which travels along the power line network and which might be received as a communication signal in one of the power line modems coupled with the network. Common sources of noise are various household devices coupled to the power line network.

Reference is now made to FIG. 1A, which is a schematic illustrations of a prior art system, generally referenced 10, for coupling a PLC communication device to a PLC network in a residence. With reference to FIG. 1A, coupling system 10 includes a PLC device 12 and a transformer 14. PLC device 12 may be a PLC modem. Transformer 14 inductively couples PLC device 12 to the PLC network (not shown). In particular a modem first line 16 and a modem second line 18 are coupled with a first winding (not referenced) of transformer 14. Network phase line 20 and network neutral line 22 are coupled with a second winding (not referenced) of transformer 14. Network phase line 20 refers to the phase line (or active line) in the residence, whereas network neutral line 22 refers to the neutral line in the residence. Together, network phase line 20 and network neutral line 22 define a network phase-neutral (herein abbreviated PN) interface (not referenced). Modem first line 16 and modem second line 18 define a modem PN interface (not referenced), which is inductively coupled with the network PN interface through transformer 14.

The noise in PLC networks can be classified into two main categories, common mode (herein abbreviated CM) noise and differential mode (herein abbreviated DM) noise. CM noise is a signal which is referenced to the ground wire in a PLC network and which is injected simultaneously with the same polarity to two different lines in a PLC network. Hence, CM noise can affect two or more elements of a PLC network in a similar manner. DM noise is a signal which is injected simultaneously with opposing polarities to two different lines in a PLC network. Models are known in the art for modeling CM noise and DM noise in PLC networks, as shown in FIGS. 1B and 1C respectively. In FIG. 1B, CM noise is modeled and filtered out by the transformer. In FIG. 1C, DM noise is modeled and is not filtered out by the transformer.

Reference is now made to FIGS. 1B and 1C, which are schematic illustrations of noise models in PLC networks, generally referenced 10' and 10", as is known in the prior art. It is noted that equivalent elements in FIGS. 1A-1C are referenced using identical numbering. With reference to FIG. 1B, coupling system 10' includes all the elements of the coupling system shown in FIG. 1A. Coupling system 10' further includes an equivalent CM noise voltage source 24 and a ground terminal 26 for modeling the interaction of CM noise with a PLC network (not shown) on the network PN interface. Voltage source 24 is coupled with both network phase line 20 and with network neutral line 22. Voltage source 24 produces CM noise signals on both network phase line 20 and on network neutral line 22. In the ideal case, this results in zero CM noise signals on the modem PN interface, as the noise is filtered out by transformer 14 on the modem PN interface side (not referenced).

A balanced interface is an interface consisting of two similar ports (or lines), each having substantially similar impedance relative to ground (i.e., ground impedance). For example, in FIG. 1B, the network PN interface is, in theory, a balanced interface as the CM noise signals produced by voltage source 24 cancel out each other at transformer 14 and are not reflected to PLC device 12. It is noted that CM noise signals are often produced by household devices coupled with the power line network or are produced internally by devices of the PLC network, such as the power supply (not shown) of PLC device 12, which is coupled with the primary winding (not referenced) of transformer 14.

With reference to FIG. 1C, coupling system 10" includes all the elements of the coupling system shown in FIG. 1A.

Coupling system 10" also includes a pair of voltage sources 28 and 30 and a ground terminal 32 for modeling the interaction of DM noise with a PLC network (not shown). Voltage source 28 is coupled between ground terminal 32 and network phase line 20. Voltage source 30 is coupled between ground terminal 32 and network neutral line 22. Pair of voltage sources 28 and 30 are similar in power but are opposite in polarity, as is shown in FIG. 1C (i.e., the polarity of voltage source 28 is opposite that of voltage source 30). Pair of voltage sources 28 and 30 produce a DM noise signal on the network PN interface. In particular, voltage source 28 produces a first portion of the DM noise signal on network phase line 20. Voltage source 30 produces a second portion of the DM noise signal, which is opposite in amplitude to the first portion of the DM noise signal, on network neutral line 22. Transformer 14 induces the DM noise signal into PLC device 12. Thus, the DM noise signal is not filtered out by transformer 14. It is noted that the main source for DM noise signals in a PLC network is the communication signal itself. Additionally, other noise sources in the electrical system of the residence may also generate a DM noise component.

Reference is now made to FIG. 2, which is a schematic illustration of a coupling system, generally referenced 50, for inductively coupling a communication device to a power line network, as is known in the art. Coupling system 50 includes a communication device 52, a first transformer 60 and a second transformer 62. Communication device 52 will be referred to herein as modem 52. The communication section (not referenced) of modem 52 is coupled with first transformer 60 and second transformer 62. It is noted that even though modem 52 is employed as both a transmitter and a receiver for the electrical device, the example set forth with reference to FIG. 2 details the receiver functionality of modem 52. The communication section of modem 52 is coupled with a first winding 70 of first transformer 60 (i.e., a modem side winding) through a first modem line 54 and a second modem line 56. The communication section of modem 52 is also coupled with a first winding 72 of second transformer 62 through a third modem line 57 and a fourth modem line 58.

A phase line 64 and a neutral line 66 of the PLC network (not referenced) are coupled with a second winding 74 of first transformer 60 (i.e., a network side winding). Each of phase line 64 and neutral line 66 includes a respective capacitor 65A and 65B for safety purposes. Neutral line 66 and a ground line 68 of the PLC network are coupled with a second winding 76 of second transformer 62. Phase line 64 and neutral line 66 define a network PN interface (not referenced). Neutral line 66 and ground line 68 define a network ground-neutral (herein abbreviated NG) interface (not referenced). First modem line 54 and second modem line 56 together define a modem PN interface, which is inductively coupled with the network PN interface through first transformer 60. Third modem line 57 and fourth modem line 58 define a modem NG interface, which is inductively coupled with the network NG interface through second transformer 62.

Phase line 64 and neutral line 66 are employed for delivering power through the power line network. Phase line 64 is also referred to as an active line or a live line. Ground line 68 is employed for safety purposes. Coupling system 50 inductively couples modem 52 to the power line network through first and second transformers 60 and 62 respectively. Modem 52 is a communication device for transmitting and receiving communication signals to and from other communication devices in the PLC network, such as other PLC modems (not shown) coupled with other electrical devices (not shown) in the residence. For example, a remote PLC modem (not shown) transmits a modulated signal through the PLC network and specifically through coupling system 50 to modem 52. In a similar manner, modem 52 can transmit a modulated signal to the remote PLC modem through coupling system 50 and through the PLC network.

As can be seen in FIG. 2, the network PN interface is not balanced. Put another way, the ground impedance of phase line 64 is different than that of neutral line 66, since the ground impedance of phase line 64 includes a summation of the impedances of both first transformer 60 and second transformer 62 whereas the ground impedance of neutral line 66 includes only the impedance of second transformer 62. It is noted that the impedance of each of first transformer 60 and second transformer 62 is dependent at least on the impedance of the modem PN interface and the modem NG interface, respectively. Due to the lack of symmetry between the ground impedance of phase line 64 and of neutral line 66, CM noise signals (not shown) on the network PN interface do not fully cancel each other out on first transformer 60.

SUMMARY OF THE PRESENT DISCLOSED TECHNIQUE

It is an object of the disclosed technique to provide a novel system for inductively coupling a PLC modem to a power line network so that the PN interface of the PLC network is balanced. In accordance with the disclosed technique, there is thus provided a coupling circuit for coupling a power line communication device to a power line network. The coupling circuit includes a first, a second and a third network port, a first and a second differential modem port, a first transformer, a second transformer, a center tap and a plurality of capacitors. The first differential modem port includes a first terminal and a second terminal. The second differential modem port includes a third terminal and a fourth terminal. The first network port is coupled between a network phase line and a first network line. The second network port is coupled between a network neutral line and a second network line. The third network port is coupled between a network ground line and a third network line.

The first transformer includes a first network side winding and a first modem side winding, each including two terminals. The first terminal and the second terminal of the first differential modem port are respectively coupled with the terminals of the first modem side winding. The first network line and the second network line extend from the first network port and from the second network port, respectively, to the terminals of the first network side winding. The second transformer includes a second network side winding and a second modem side winding, each including two terminals. The third terminal and the fourth terminal of the second differential modem port are respectively coupled with the terminals of the second modem side winding. The third network line extends from the third network port to a first terminal of the second network side winding. The center tap extends from the midpoint of the first network side winding to a second terminal of the second network side winding. The plurality of capacitors are coupled between at least two of the midpoint of the first network side winding and the second terminal of the second network side winding, a first one of the two terminals of the first network side winding and the first network port and a second one of the two terminals of the first network side winding and the second network port.

According to another aspect of the disclosed technique, there is thus provided a power line communication device including a coupling circuit for coupling the power line communication device to a power line network. The coupling circuit includes a first, a second and a third network port, a first and a second differential modem port, a first transformer, a second transformer, a center tap and a plurality of capacitors. The first differential modem port includes a first terminal and a second terminal. The second differential modem port includes a third terminal and a fourth terminal. The first network port is coupled between a network phase line and a first network line. The second network port is coupled between a network neutral line and a second network line. The third network port is coupled between a network ground line and a third network line.

The first transformer includes a first network side winding and a first modem side winding, each including two terminals. The first terminal and the second terminal of the first differential modem port are respectively coupled with the terminals of the first modem side winding. The first network line and the second network line extend from the first network port and from the second network port, respectively, to the terminals of the first network side winding. The second transformer includes a second network side winding and a second modem side winding, each including two terminals. The third terminal and the fourth terminal of the second differential modem port are respectively coupled with the terminals of the second modem side winding. The third network line extends from the third network port to a first terminal of the second network side winding. The center tap extends from the midpoint of the first network side winding to a second terminal of the second network side winding. The plurality of capacitors are coupled between at least two of the midpoint of the first network side winding and the second terminal of the second network side winding, a first one of the two terminals of the first network side winding and the first network port and a second one of the two terminals of the first network side winding and the second network port.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a circuit for inductively coupling a PLC modem to a power line network such that the network PN interface of the PLC network is balanced. The balanced coupling circuit includes two differential modem ports, three network ports, two transformers and a center tap. Each of the differential modem ports is coupled with a respective transformer. Each of the network ports is coupled with a selected network line (i.e., a network phase line, a network neutral line and a network ground line). A first line of a first differential modem port and a second line of the first differential modem port are coupled with the terminals of the modem side winding of the first transformer. A first line of a second differential modem port and a second line of the second differential modem port are coupled with the terminals of the modem side winding of the second transformer. The first network port and the second network port are coupled with the terminals of the network side winding of the first transformer. The third network port is coupled with a first terminal of the network side winding of the second transformer. The center tap extends from the midpoint of the network side winding of the first transformer to a second terminal of the network side winding of the second transformer. Thus, the ground impedances of the first network port and the second network port are substantially similar. In this manner, an interface defined by the first network port and the second network port is balanced.

Figure 1A:
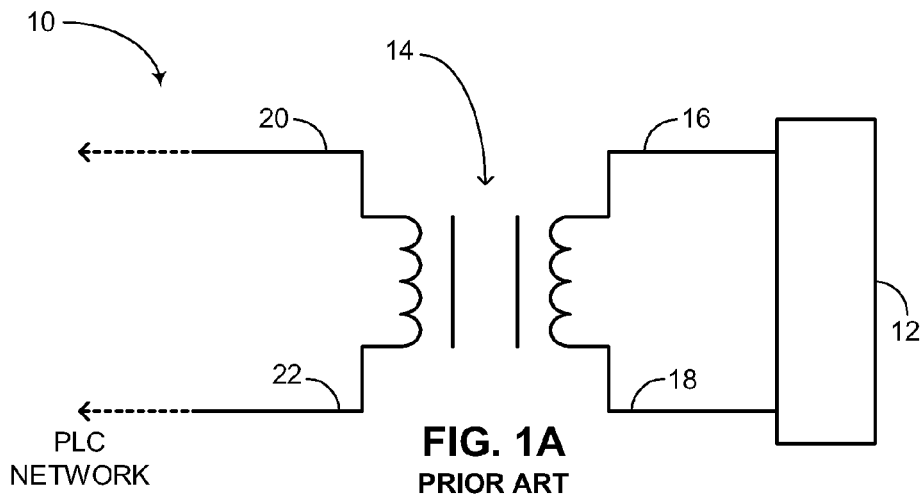
FIG. 1A is a schematic illustration of a prior art system for coupling a PLC communication device to a PLC network in a residence.
Figure 1B:
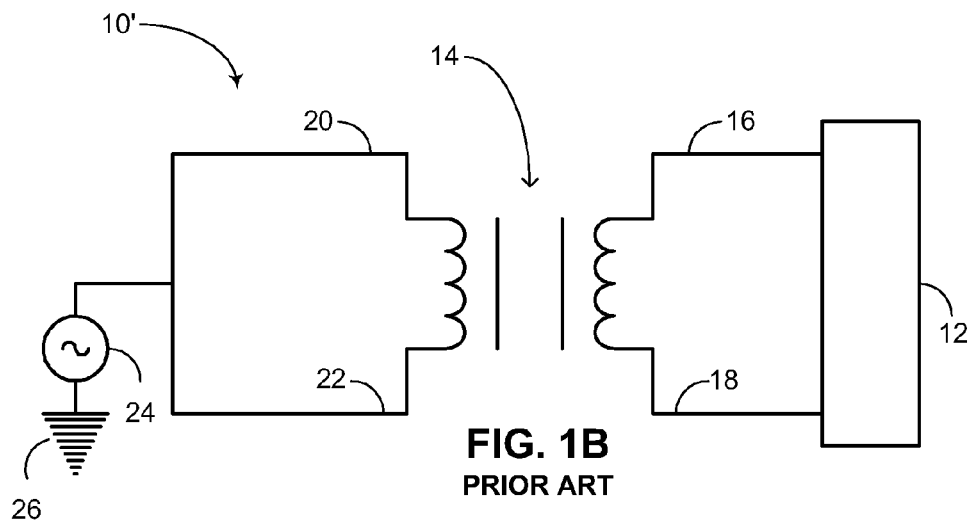
FIGS. 1B and 1C are schematic illustrations of noise models in PLC networks, as is known in the prior art.
Figure 1C:
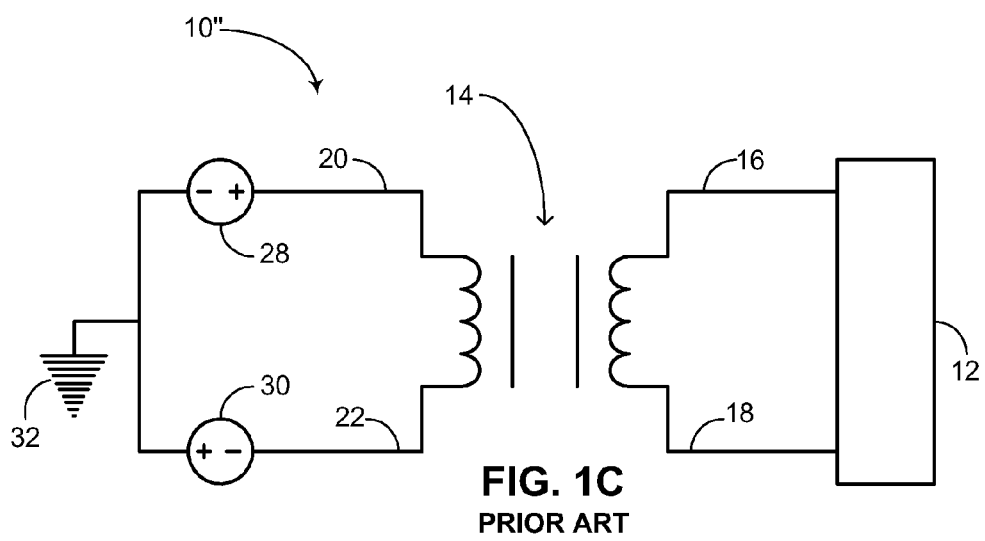
Figure 2:
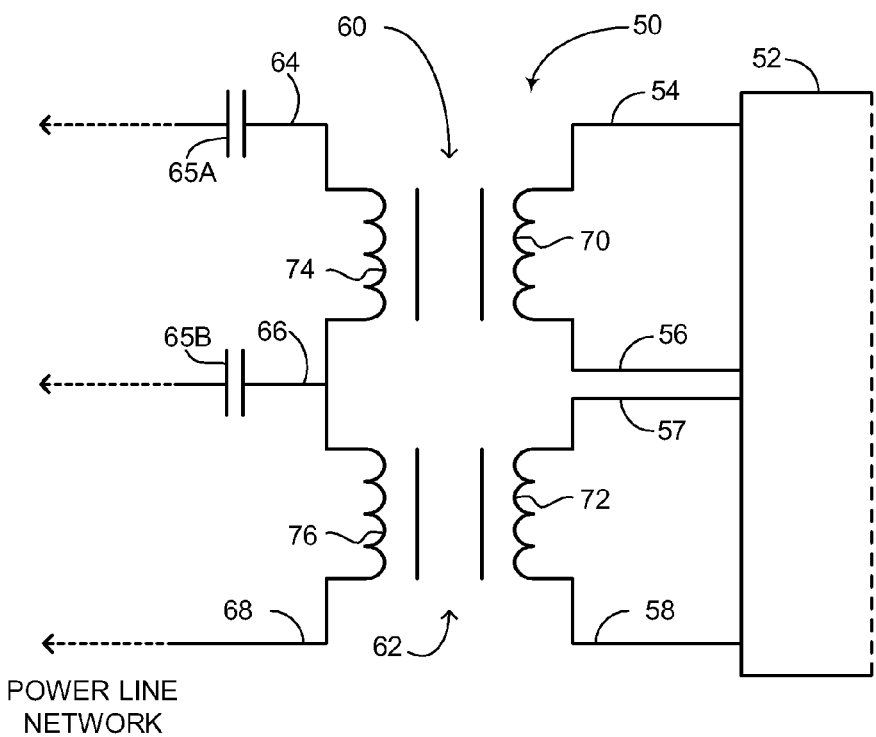
FIG. 2 is a schematic illustration of a coupling system for inductively coupling a communication device to a power line network, as is known in the art.
Figure 3A:
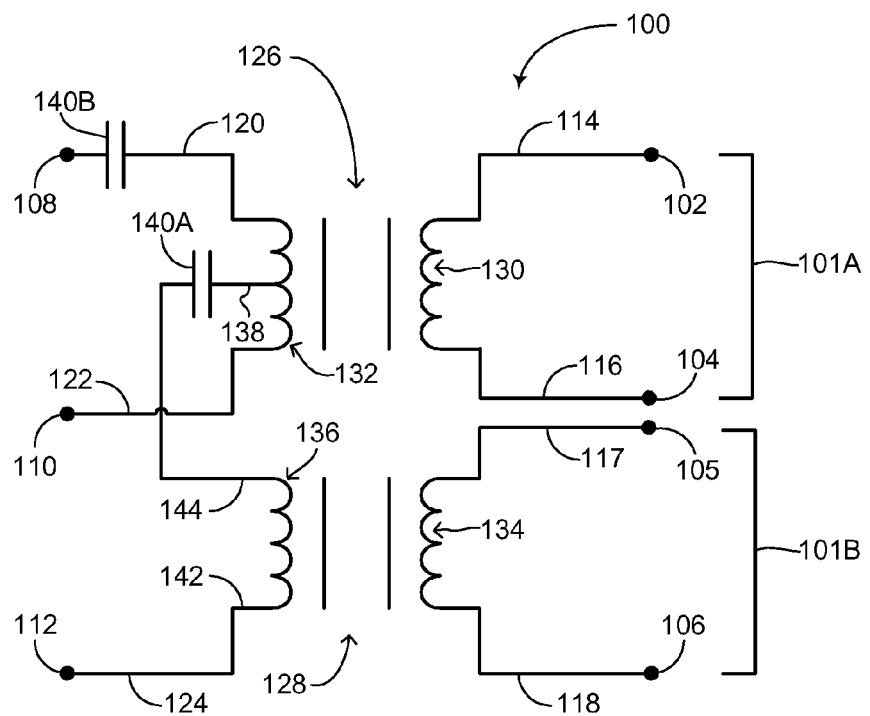
FIG. 3A is a schematic illustration of a balanced coupling circuit for inductively coupling a PLC modem to a power line network, constructed and operative in accordance with an embodiment of the disclosed technique.

Reference is now made to FIG. 3A, which is a schematic illustration of a balanced coupling circuit, generally referenced 100, for inductively coupling a PLC modem to a power line network, constructed and operative in accordance with an embodiment of the disclosed technique. The balanced coupling circuit enables a network PN interface to be balanced. Balanced coupling circuit 100 includes a first differential modem port 101A, a second differential modem port 101B, a first network port 108, a second network port 110, a third network port 112, a first transformer line 114, a second transformer line 116, a third transformer line 117, a fourth transformer line 118, a first network line 120, a second network line 122, a third network line 124, a first transformer 126, a second transformer 128, a center tap 138, a center tap capacitor 140A and a first network line capacitor 140B. First differential modem port 101A includes a first terminal 102 and a second terminal 104. Second differential modem port 101B includes a third terminal 105 and a fourth terminal 106. It is noted that first differential modem port 101A and second differential modem port 101B are not coupled with one another. First transformer line 114 and second transformer line 116 extend from first terminal 102 and second terminal 104 respectively to the terminals (not referenced) of a modem side winding 130 of first transformer 126. Third transformer line 117 and fourth transformer line 118 extend from third terminal 105 and fourth terminal 106 respectively to the terminals (not referenced) of a modem side winding 134 of second transformer 128. First network line 120 and second network line 122 extend from first network port 108 and second network port 110 respectively to the terminals (not referenced) of a network side winding 132 of first transformer 126. Third network line 124 extends from third network port 112 to a first terminal 142 of a network side winding 136 of second transformer 128. Center tap 138 extends from the midpoint (not referenced) of network side winding 132 of first transformer 126 to a second terminal 144 of network side winding 136 of second transformer 128. Center tap capacitor 140A is coupled in between center tap 138 of network side winding 132 and second terminal 144 of network side winding 136. First network line capacitor 140B is coupled in between a first terminal (not referenced) of network side winding 132 of first transformer 126 and first network port 108. Center tap capacitor 140A and first network line capacitor 140B are installed for meeting safety regulations.

First terminal 102 and second terminal 104 form a pair of terminals in first differential modem port 101A. First transformer line 114 and first terminal 102 can represent, for example, a modem side phase line, if first network line 120 is a phase line. Second transformer line 116 and second terminal 104 can represent, for example, a modem side neutral line, if second network line 122 is a neutral line. Third terminal 105 and fourth terminal 106 form a pair of terminals in second differential modem port 101B. Fourth transformer line 118 and fourth terminal 106 can represent, for example, a modem side ground line, if third network line 124 is a ground line. Third transformer line 117 and third terminal 105 can represent, for example, a modem side phase-neutral line, if first network line 120 and second network line 122 are respectively a phase line and a neutral line. First network port 108 is coupled with a PLC network line, such as a PLC network phase line (not shown). Second network port 110 is coupled with a PLC network line, such as a PLC network neutral line (not shown). Third network port 112 is coupled with a PLC network line, such as a PLC network ground line (not shown). First terminal 102 and second terminal 104 together define a first modem communication interface (not referenced), such as a modem PN interface. Third terminal 105 and fourth terminal 106 together define a second modem communication interface (not referenced), such as a modem PNG interface. First network port 108 and second network port 110 together define a first network communication interface (not referenced), such as a network PN interface. Second network port 110 and third network port 112 together define a second network communication interface (not referenced), such as a network NG interface.

According to the disclosed technique, the first network communication interface is balanced as it consists of similar conducting lines, i.e. first network line 120 and second network line 122, having similar impedances along their length and having similar ground impedances. Thus any CM noise signals traveling through first network line 120 and second network line 122, i.e. CM noise signals traveling through the network PN interface, substantially cancel each other on network side winding 132 of first transformer 126. Network side winding 132 of first transformer 126 defines a first phase-neutral-ground (herein abbreviated PNG) communication channel. In particular, network side winding 132 is coupled with, either directly or indirectly, each of first network line 120 (e.g. a phase line), third network line 124 (e.g. a ground line) and second network line 122 (e.g. a neutral line). Network side winding 136 of second transformer 128 defines a second PNG communication channel. In particular, network side winding 136 is coupled with, either directly or indirectly, each of first network line 120, third network line 124 and second network line 122.

Hence, modem side winding 130 of first transformer 126 couples first differential modem port 101A of a PLC modem (not shown) to the first PN communication channel. Modem side winding 134 of second transformer 128 couples second differential modem port 101B of the modem to the second PNG communication channel. A signal received on first and second terminals 102 and 104 is a combination of the signals on the first and second network lines, e.g. the PN lines. In addition, a signal received on third and fourth terminals 105 and 106 is a combination of the signals on first, second and third network lines, e.g. the PNG lines. As a consequence, balanced coupling circuit 100 couples two different combinations of the PN and NG signals to the PLC modem instead of independently coupling the PN signal alone to one port on the PLC modem and the NG signal alone to another port of the PLC modem as is done in the prior art.

Figure 3B:
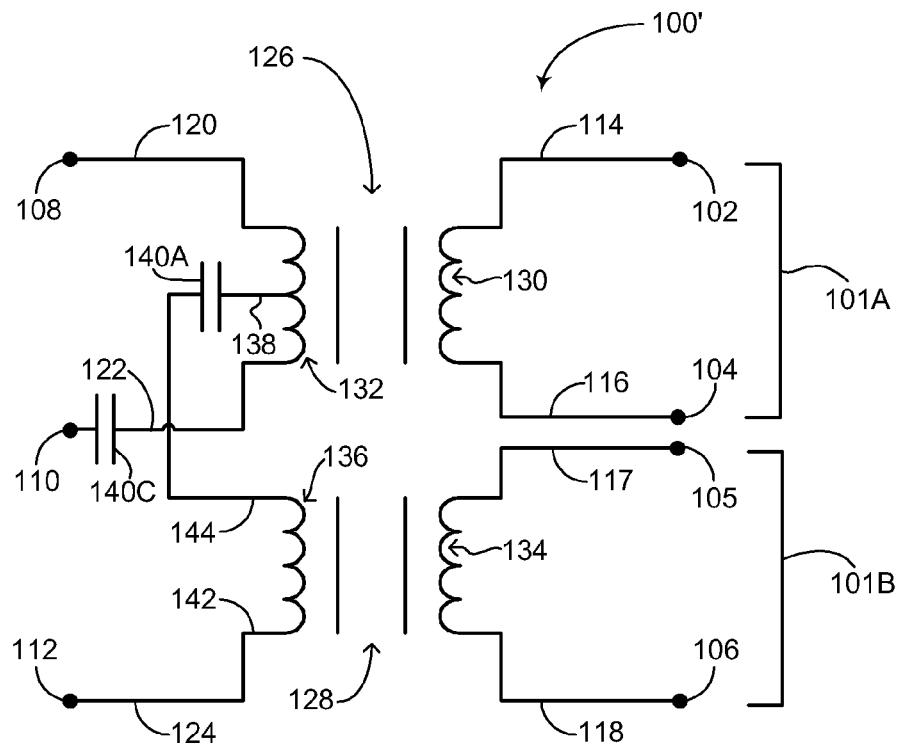
FIG. 3B is a schematic illustration of another balanced coupling circuit for inductively coupling a PLC modem to a power line network, constructed and operative in accordance with another embodiment of the disclosed technique.

Reference is now made to FIG. 3B, which is a schematic illustration of another balanced coupling circuit, generally referenced 100', for inductively coupling a PLC modem to a power line network, constructed and operative in accordance with another embodiment of the disclosed technique. Balanced coupling circuit 100' is substantially similar to balanced coupling circuit 100 (FIG. 3A). Equivalent elements in FIGS. 3A and 3B are referenced using identical numbers. Balanced coupling circuit 100' differs from balanced coupling circuit 100 in that a first network line capacitor 140B (FIG. 3A) has been removed from balanced coupling circuit 100'. In addition, balanced coupling circuit 100' includes a second network line capacitor 140C, coupled in between a second terminal (not referenced) of network side winding 132 of first transformer 126 and second network port 110. As in FIG. 3A, second network line capacitor 140C along with a center tap capacitor 140A are installed for meeting safety regulations.

Figure 3C:
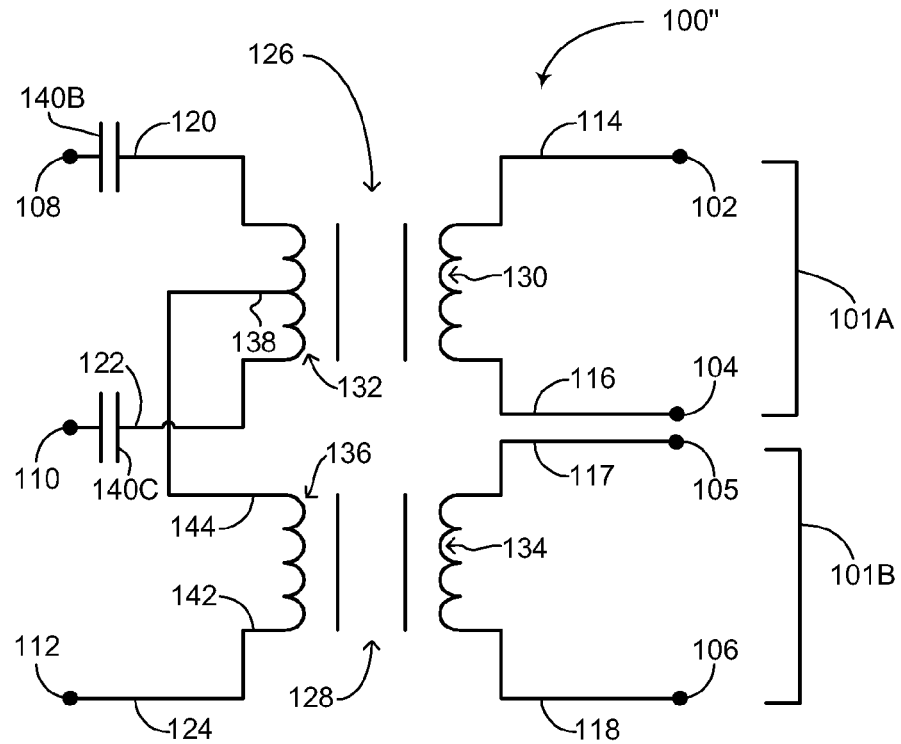
FIG. 3C is a schematic illustration of a further balanced coupling circuit for inductively coupling a PLC modem to a power line network, constructed and operative in accordance with a further embodiment of the disclosed technique.

Reference is now made to FIG. 3C, which is a schematic illustration of a further balanced coupling circuit, generally referenced 100", for inductively coupling a PLC modem to a power line network, constructed and operative in accordance with a further embodiment of the disclosed technique. Balanced coupling circuit 100" is substantially similar to balanced coupling circuit 100' (FIG. 3B). Equivalent elements in FIGS. 3B and 3C are referenced using identical numbers. Balanced coupling circuit 100" differs from balanced coupling circuit 100' in that both first network line 120 and second network line 122 include respective first network line and second network line capacitors 140B and 140C and that a center tap capacitor 140A has been removed. Therefore in FIG. 3C, a center tap 138 directly couples a network side winding 132 of a first transformer 126 with a second terminal 144 of a network side winding 136 of a second transformer 128. First network line capacitor 140B is coupled between a first network port 108 and a first terminal (not referenced) of network side winding 132 of first transformer 126. Second network line capacitor 140C is coupled between a second network port 110 and a second terminal (not referenced) of network side winding 132 of first transformer 126. As mentioned above, first network line and second network line capacitors 140B and 140C are installed for meeting safety regulations.

Figure 3D:
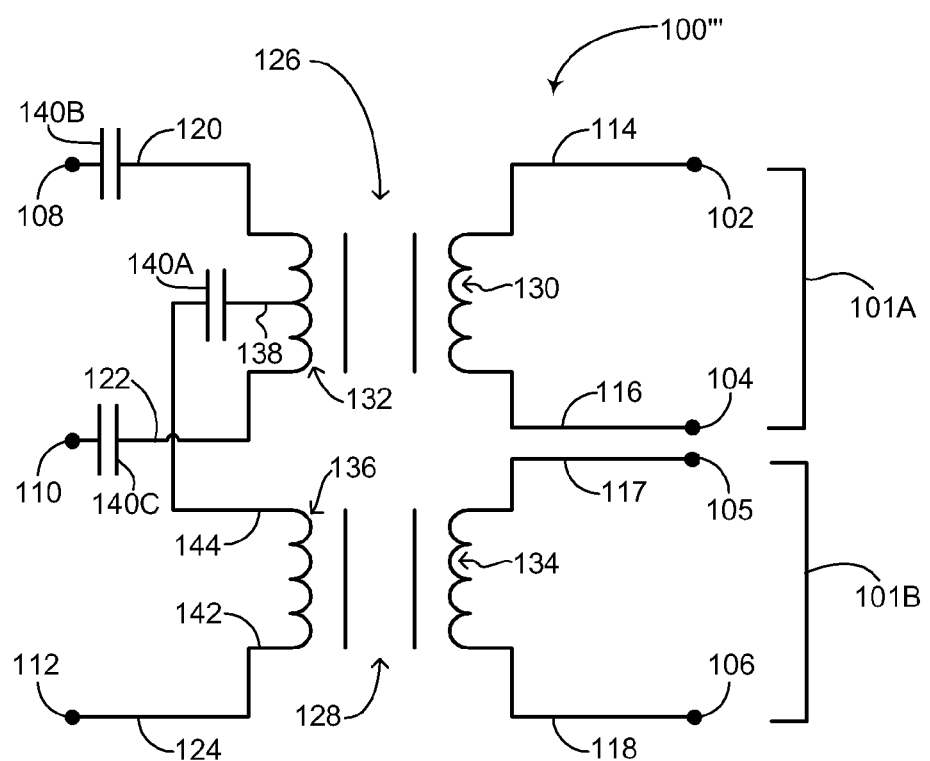
FIG. 3D is a schematic illustration of an additional balanced coupling circuit for inductively coupling a PLC modem to a power line network, constructed and operative in accordance with another embodiment of the disclosed technique.

Reference is now made to FIG. 3D, which is a schematic illustration of an additional balanced coupling circuit, generally referenced 100''', for inductively coupling a PLC modem to a power line network, constructed and operative in accordance with another embodiment of the disclosed technique. Balanced coupling circuit 100''' is substantially similar to balanced coupling circuits 100 (FIG. 3A), 100' (FIG. 3B) and 100" (FIG. 3C). Equivalent elements in FIGS. 3A, 3B and 3C are referenced using identical numbers. Balanced coupling circuit 100''' includes a center tap capacitor 140A, a first network line capacitor 140B and a second network line capacitor 140C, each positioned in balanced coupling circuit 100''' in a manner similar to their respective positions in FIGS. 3A-3C. As mentioned above, center tap capacitor 140A, first network line capacitor 140B and second network line capacitor 140C are installed for meeting safety regulations.

It is noted that each of the embodiments of the balanced coupling circuit of the disclosed technique, as shown above in FIGS. 3A, 3B, 3C and 3D, may be enclosed within a PLC modem (not shown). Therefore, balanced coupling circuits 100, 100', 100" and 100''' may each be embodied as part of a PLC modem. Such a PLC modem would have one side which would couple it to the power line network via first network port 108, second network port 110 and third network port 112. Such a PLC modem could also optionally have another side which would couple it to an electrical device, such as a computer (not shown) or a printer (not shown), via first differential modem port 101A and second differential modem port 101B.

It will be appreciated by persons skilled in the art that the disclosed technique is not limited to what has been particularly shown and described hereinabove. Rather the scope of the disclosed technique is defined only by the claims, which follow.

The invention claimed is:

1. Coupling circuit for coupling a power line communication device to a power line network, comprising:
    a first network port, coupled between a network phase line and a first network line;
    a second network port, coupled between a network neutral line and a second network line;
    a third network port, coupled between a network ground line and a third network line;
    a first differential modem port, comprising a first terminal and a second terminal;
    a second differential modem port, comprising a third terminal and a fourth terminal;
    a first transformer, comprising a first network side winding and a first modem side winding, each of said first network side winding and said first modem side winding respectively comprising two terminals, said first terminal and said second terminal of said first differential modem port being respectively coupled with said two terminals of said first modem side winding, said first network line and said second network line extending from said first network port and from said second network port respectively to said two terminals of said first network side winding;
    a second transformer, comprising a second network side winding and a second modem side winding, each of said second network side winding and said second modem side winding respectively comprising two terminals, said third terminal and said fourth terminal of said second differential modem port being respectively coupled with said two terminals of said second modem side winding, said third network line extending from said third network port to a first terminal of said second network side winding;
    a center tap, extending from a midpoint of said first network side winding to a second terminal of said second network side winding; and
    at least two capacitors, coupled between at least any two of:
        said midpoint of said first network side winding and said second terminal of said second network side winding;
        a first one of said two terminals of said first network side winding and said first network port; and
        a second one of said two terminals of said first network side winding and said second network port.

2. The coupling circuit according to claim 1, wherein a first one of said at least two capacitors is coupled between said second terminal of said second network side winding and said midpoint of said first network side winding and wherein a second one of said at least two capacitors is coupled between said first one of said two terminals of said first network side winding and said first network port.

3. The coupling circuit according to claim 1, wherein a first one of said at least two capacitors is coupled between said second terminal of said second network side winding and said midpoint of said first network side winding and wherein a second one of said at least two capacitors is coupled between said second one of said two terminals of said first network side winding and said second network port.

4. The coupling circuit according to claim 1, wherein a first one of said at least two capacitors is coupled between said first one of said two terminals of said first network side winding and said first network port and wherein a second one of said at least two capacitors is coupled between said second one of said two terminals of said first network side winding and said second network port.

5. The coupling circuit according to claim 1, wherein a first one of said at least two capacitors is coupled between said first one of said two terminals of said first network side winding and said first network port, wherein a second one of said at least two capacitors is coupled between said second one of said two terminals of said first network side winding and said second network port and wherein a third one of said at least two capacitors is coupled between said second terminal of said second network side winding and said midpoint of said first network side winding.

6. The coupling circuit according to claim 1, wherein said first network line and said second network line form a network phase-neutral (PN) interface and wherein said network PN interface is balanced.

7. Power line communication device comprising a coupling circuit for coupling said power line communication device to a power line network, comprising:
    a first network port, coupled between a network phase line and a first network line;
    a second network port, coupled between a network neutral line and a second network line;
    a third network port, coupled between a network ground line and a third network line;
    a first differential modem port, comprising a first terminal and a second terminal;
    a second differential modem port, comprising a third terminal and a fourth terminal;
    a first transformer, comprising a first network side winding and a first modem side winding, each of said first network side winding and said first modem side winding respectively comprising two terminals, said first terminal and said second terminal of said first differential modem port being respectively coupled with said two terminals of said first modem side winding, said first network line and said second network line extending from said first network port and from said second network port respectively to said two terminals of said first network side winding;
    a second transformer, comprising a second network side winding and a second modem side winding, each of said second network side winding and said second modem side winding respectively comprising two terminals, said third terminal and said fourth terminal of said second differential modem port being respectively coupled with said two terminals of said second modem side winding, said third network line extending from said third network port to a first terminal of said second network side winding;
    a center tap, extending from a midpoint of said first network side winding to a second terminal of said second network side winding;
    and at least two capacitors, coupled between at least any two of: said midpoint of said first network side winding and said second terminal of said second network side winding;

a first one of said two terminals of said first network side winding and said first network port; and a second one of said two terminals of said first network side winding and said second network port.

* * * * *